(12) United States Patent
Rodriguez

(10) Patent No.: US 10,321,098 B2
(45) Date of Patent: *Jun. 11, 2019

(54) DATA CENTER RAISED FLOOR MONITORING

(71) Applicant: International Business Machines Corporation, Armonk, NY (US)

(72) Inventor: Jean-Michel Rodriguez, Herault (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,517

(22) Filed: Oct. 6, 2017

(65) Prior Publication Data

US 2018/0048869 A1 Feb. 15, 2018

Related U.S. Application Data

(63) Continuation of application No. 14/717,062, filed on May 20, 2015.

(30) Foreign Application Priority Data

Jun. 11, 2014 (GB) .................................. 1410364.2

(51) Int. Cl.
  *H04N 7/18* (2006.01)
  *H04N 5/33* (2006.01)
  *G06T 7/00* (2017.01)
  *H04N 5/225* (2006.01)

(52) U.S. Cl.
  CPC ............. *H04N 7/181* (2013.01); *G06T 7/001* (2013.01); *H04N 5/2251* (2013.01); *H04N 5/332* (2013.01); *G06T 2207/10048* (2013.01)

(58) Field of Classification Search
  CPC .............................. H04N 7/181; H04N 5/247
  See application file for complete search history.

(56) References Cited

U.S. PATENT DOCUMENTS

| | | |
|---|---|---|
| 7,315,448 B1 | 1/2008 | Bash et al. |
| 8,538,584 B2 | 9/2013 | Pandey et al. |
| 8,558,882 B1 | 10/2013 | Kotab et al. |
| 8,845,404 B2 | 9/2014 | Bash et al. |
| 9,157,812 B1 | 10/2015 | Gennello |
| 9,319,295 B2 | 4/2016 | Sturgeon et al. |
| 9,347,834 B2 | 5/2016 | Adriaenssens et al. |
| 2005/0155646 A1 | 7/2005 | Bash et al. |
| 2005/0255724 A1 | 11/2005 | Picco et al. |

(Continued)

OTHER PUBLICATIONS

Decision to Grant a Patent, Application No. 1410364.2, dated Jun. 11, 2014, Mailed May 10, 2016, 2 pages.

(Continued)

*Primary Examiner* — Jonathan R Messmore
(74) *Attorney, Agent, or Firm* — Peter J. Edwards

(57) ABSTRACT

One or more aspects relates to monitoring conditions under a raised floor in a data center. A grid of raised floor tiles has regular floor tiles interspersed with sensor floor tiles. The sensor floor tiles include: one or more sensors to monitor conditions under the raised floor; and one or more cameras to collect images of conditions under the raised floor. A sensor controller is used to locate a sensor tile with a sensor condition that is out-of-band from a reference condition band; and an image controller is used to locate an image difference corresponding to the out-of-band sensor condition.

8 Claims, 11 Drawing Sheets

(56) References Cited

U.S. PATENT DOCUMENTS

| 2006/0240867 | A1 | 10/2006 | Wang et al. |
| 2007/0171086 | A1 | 7/2007 | Belady |
| 2008/0129723 | A1 | 6/2008 | Comer et al. |
| 2010/0232589 | A1 | 9/2010 | Vernick |
| 2012/0072195 | A1 | 3/2012 | Archibald et al. |
| 2012/0249801 | A1 | 10/2012 | Nozaki |
| 2015/0365630 | A1 | 12/2015 | Rodriguez |

OTHER PUBLICATIONS

Search Report under Section 17(5) for GB1410364.2, Dated Dec. 4, 2014, 3 pages.
Rodriguez, "Data Center Raised Floor Monitoring," U.S. Appl. No. 15/726,539, filed Oct. 6, 2017.
List of IBM Patents or Patent Publications Treated as Related, Dated Oct. 5, 2017, 2 pages.
Rodriguez, "Data Center Raised Floor Monitoring," Application No. 1410364.2, Filed Jun. 11, 2014.

Tile Controller Coordinator 400

Tile Interface 402

Threshold Registers 404

Sensor Comparator 406

Image comparator 408

Infrared image comparator 410

Data Center Interface 412

Tile Controller Coordinator Method 500

FIGURE 4

DATA CENTER RAISED FLOOR MONITORING

This application claims priority from United Kingdom patent application number 1410364.2, filed Jun. 11, 2014, which is hereby incorporated herein by reference in its entirety.

BACKGROUND

One or more aspects relate to data center raised floor monitoring.

One problem in data center management is the lack of information concerning under raised floor behavior. Data is difficult to gather and any physical modification can strongly impact cooling behavior and energy efficiency of the data center.

US patent publication 2012/0072195, which is hereby incorporated by reference herein in its entirety, discloses modeling movement of air under a floor of a data center.

US patent publication 2007/0171086, which is hereby incorporated by reference herein in its entirety, discloses an environmental monitor for monitoring conditions under a raised floor.

U.S. Pat. No. 8,538,584, which is hereby incorporated by reference herein in its entirety, discloses an apparatus and method for controlling environmental conditions in a data center.

SUMMARY

In one aspect, a system for monitoring conditions under a raised floor in a data center is provided. The system includes, for instance, a sensor tile, the sensor tile including one or more sensors to monitor conditions under the raised floor, the raised floor including a grid of raised floor tiles having regular floor tiles interspersed with sensor tiles; and one or more cameras to collect images of conditions under the raised floor. The system further includes a sensor comparator to locate a sensor tile with a sensor condition that is out-of-band from a reference condition band; and an image comparator to locate an image difference corresponding to the out-of-band sensor condition.

BRIEF DESCRIPTION OF THE DRAWINGS

Embodiments of the present invention will now be described, by way of example only, with reference to the following drawings in which:

FIG. 4 is one example of a component diagram of a tile controller coordinator of one embodiment.

DETAILED DESCRIPTION

Figure 1A:
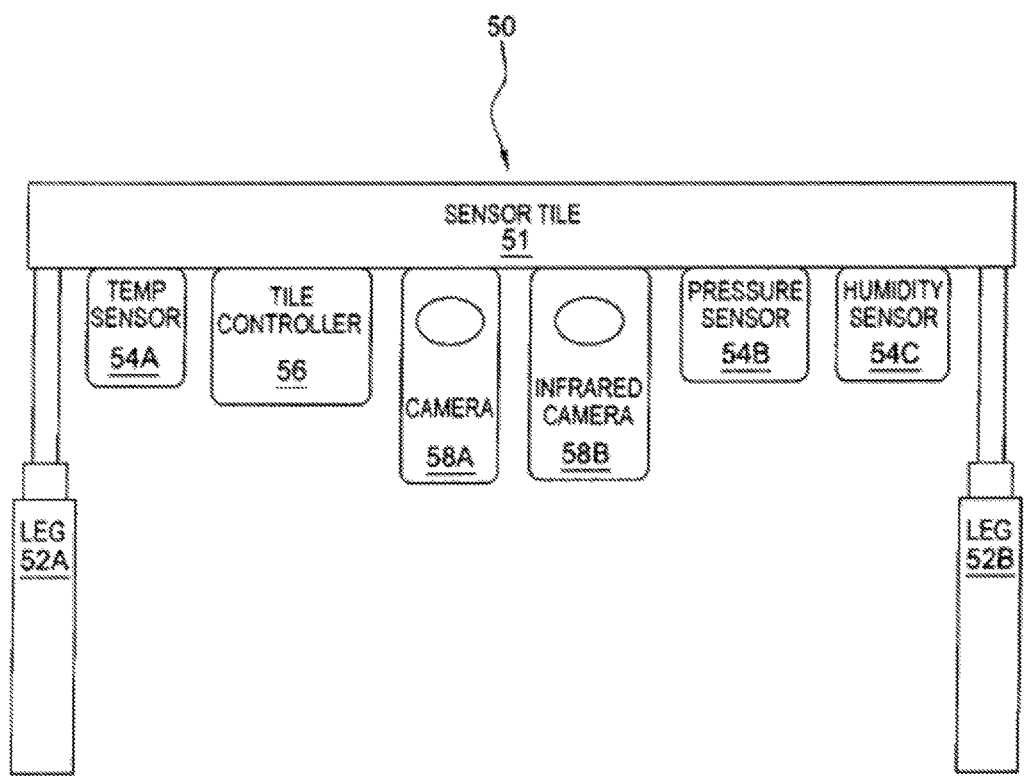
FIG. 1A is one example of a side view of a tile of one embodiment showing the sensors.

Referring to FIG. 1A, a sensor module 50 includes, for example: a sensor tile 51; telescopic legs 52A, 52B (and 52C and 52D not shown); a temperature sensor 54A, a pressure sensor 54B, a humidity sensor 54C; a tile controller 56; a camera 58A and an infrared camera 58B.

Sensor tile 51 is the tile that supports the sensors and controller of one embodiment. In other embodiments, the sensors and controller may be attached to other parts of the sensor module 50 including the telescopic legs 52A to 52D.

Telescopic legs 52A to 52D are connected to the four corners of the sensor tile 51 for raising the sensor tile up (so that it is higher than surrounding tiles) and down (so that it is level with surrounding tiles). Four telescopic legs are used for stability, in one example, but three or less telescopic legs are also envisaged.

Temperature sensor 54A is attached to the underneath side of sensor tile 51 for measuring temperature underneath the raised floor and for measuring the temperature in the room when the tile is raised above the level of the floor.

Pressure sensor 54B is attached to the underneath side of sensor tile 51 for measuring air pressure underneath the raised floor and for measuring air pressure in the room when the tile is raised above the level of the floor.

Humidity sensor 54C is attached to the underneath side of sensor tile 51 for measuring humidity levels underneath the raised floor and for measuring the humidity levels in the room when the tile is raised above the level of the floor.

Tile controller 56 is attached to the underneath side of the sensor tile 51 for logging the data from the sensors and cameras.

Camera 58A is attached to the underneath side of sensor tile 51 for recording images from underneath the raised floor. In one embodiment, camera 58A is a wide angle camera pointing down from the sensor tile. An embodiment where at least two cameras are fixed to a camera post hanging from sensor tile 51 is also envisaged for capturing images underneath neighboring tiles. An embodiment where there is a single camera fixed to a rotating camera post is also envisaged.

Infrared camera 58B is attached to the underneath of sensor tile 51 for recording infrared images from underneath the raised floor. In one embodiment, infrared camera 58B is a wide angle camera pointing down from the sensor tile. An embodiment where at least two infrared cameras are between three normal cameras 58A on a camera post is envisaged. An embodiment where there is a single infrared camera on the rotating camera post is also envisaged.

Figure 1B:
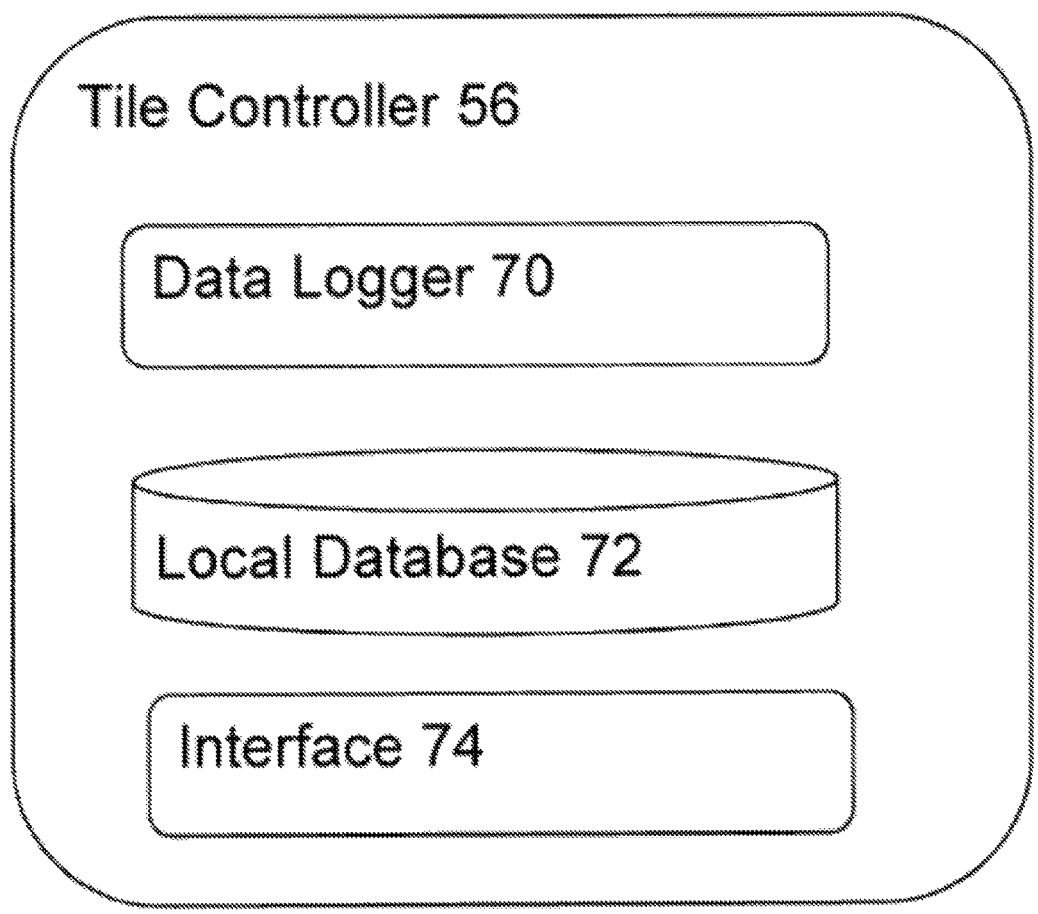
FIG. 1B is one example of a schematic view of a tile controller.

Referring to FIG. 1B, tile controller 56 includes, for instance: a data logger 70; a local database 72; and an interface 74.

Data logger 70 is for logging data from the sensors and cameras.

Local database 72 is for storing the logged data.

Interface 74 is for passing the stored data to a tile controller coordinator.

Figure 1C:
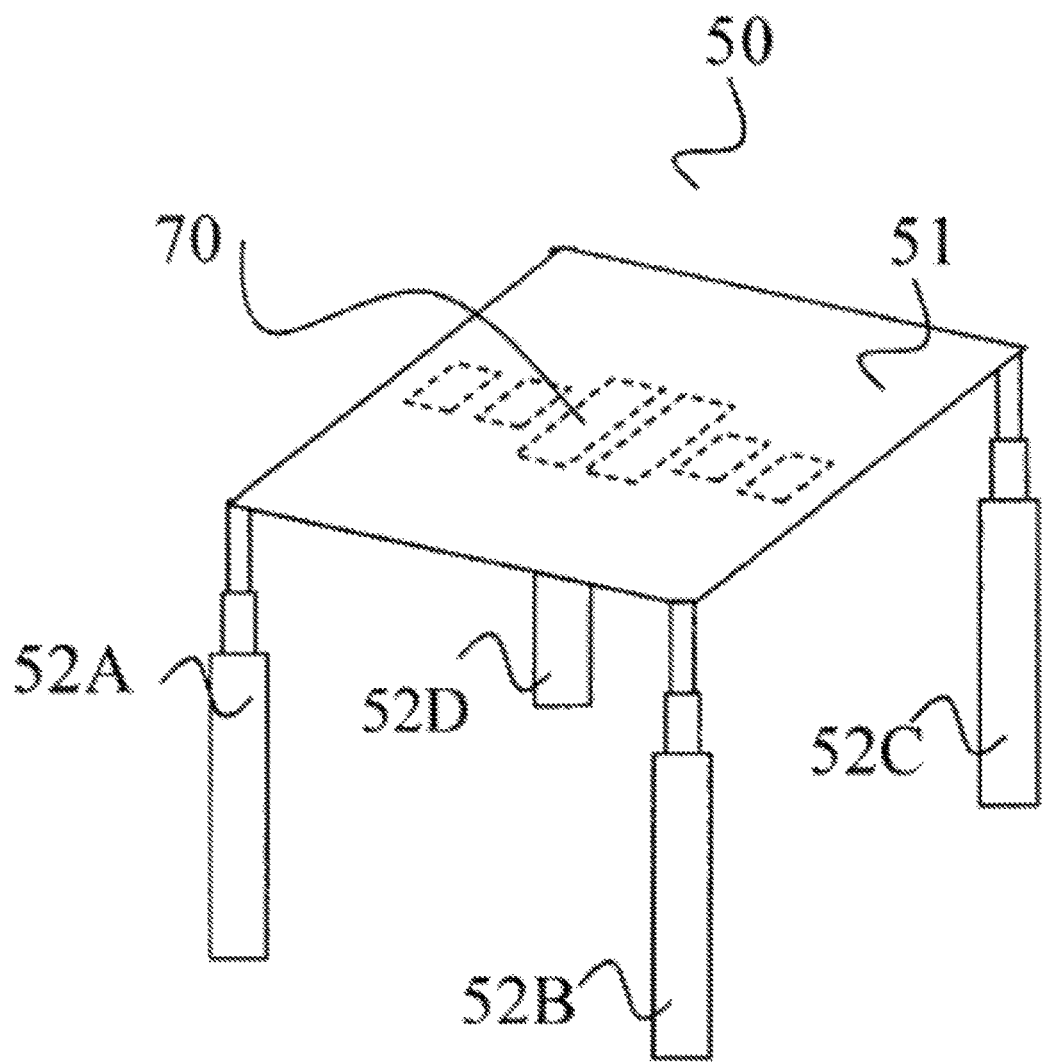
FIG. 1C is one example of an isometric view of the tile of one embodiment.

Referring to FIG. 1C, a sensor module 50 of one embodiment may be seen in isometric projection including: sensor tile 51; telescopic legs 52A to 52D; and a dotted outline 70 on the outside of sensor tile 51 representing the general area where the sensors, cameras and controller are located on the underneath of sensor tile 51.

Figure 1D:
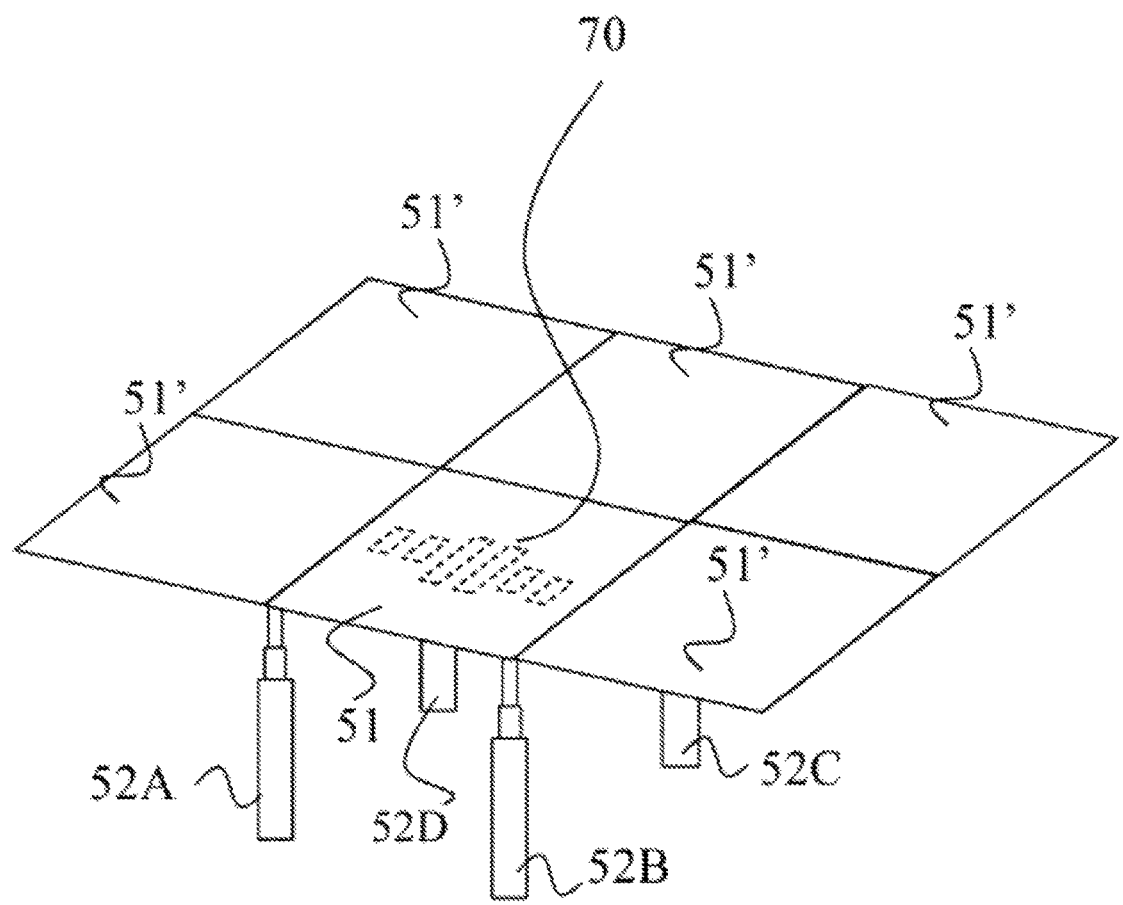
FIG. 1D is one example of an isometric view of the tile of one embodiment with regular tiles at the side and back.

Referring to FIG. 1D, there is shown an isometric view of the sensor tile 51 of one embodiment surrounded by five regular tiles 51' at the side and back.

Figure 1E:
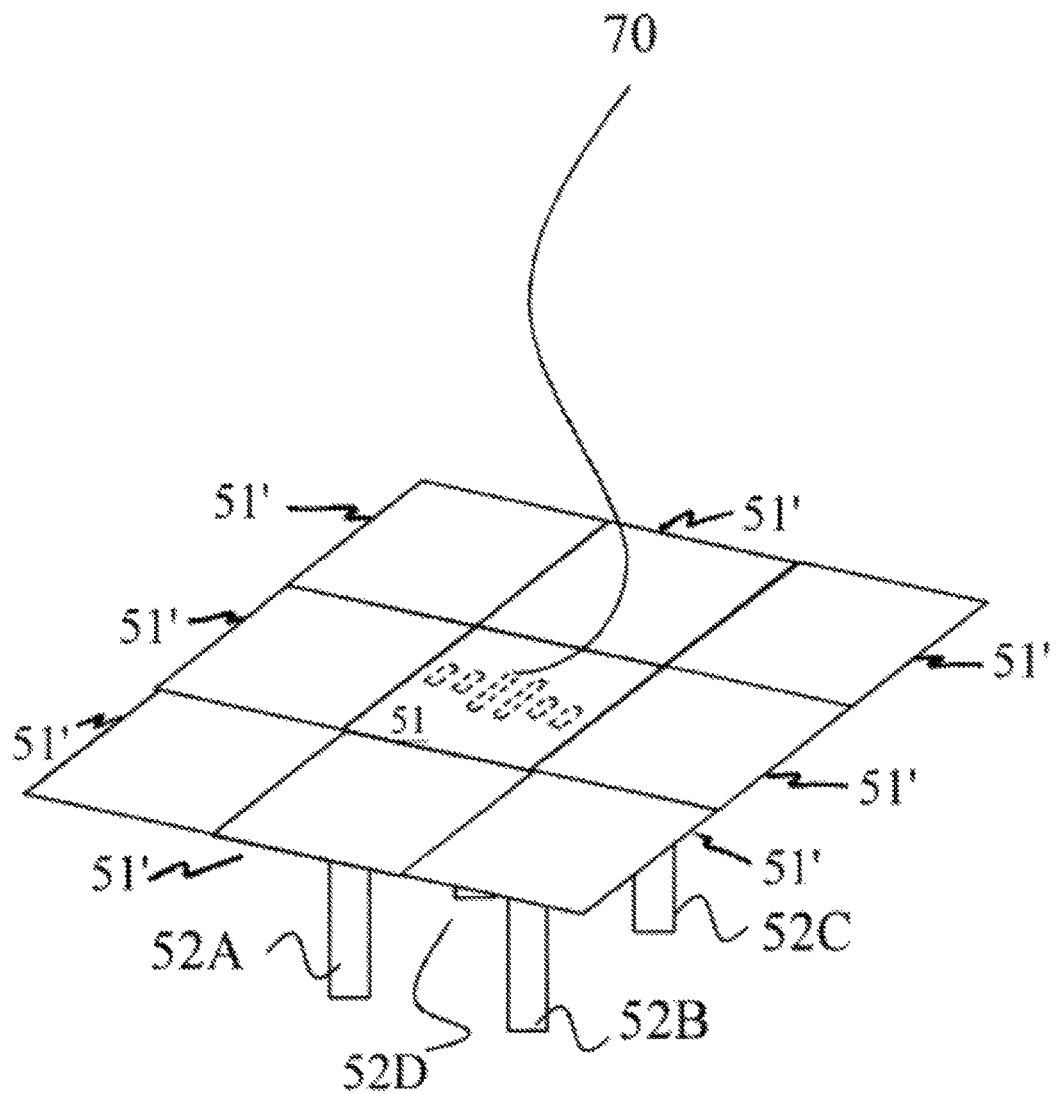
FIG. 1E is an isometric view of the tile of one embodiment with regular tiles at the side, back and front.

Referring to FIG. 1E, there is shown an isometric view of the sensor tile 51 of one embodiment completely surrounded by eight regular tiles 51'.

Figure 1F:
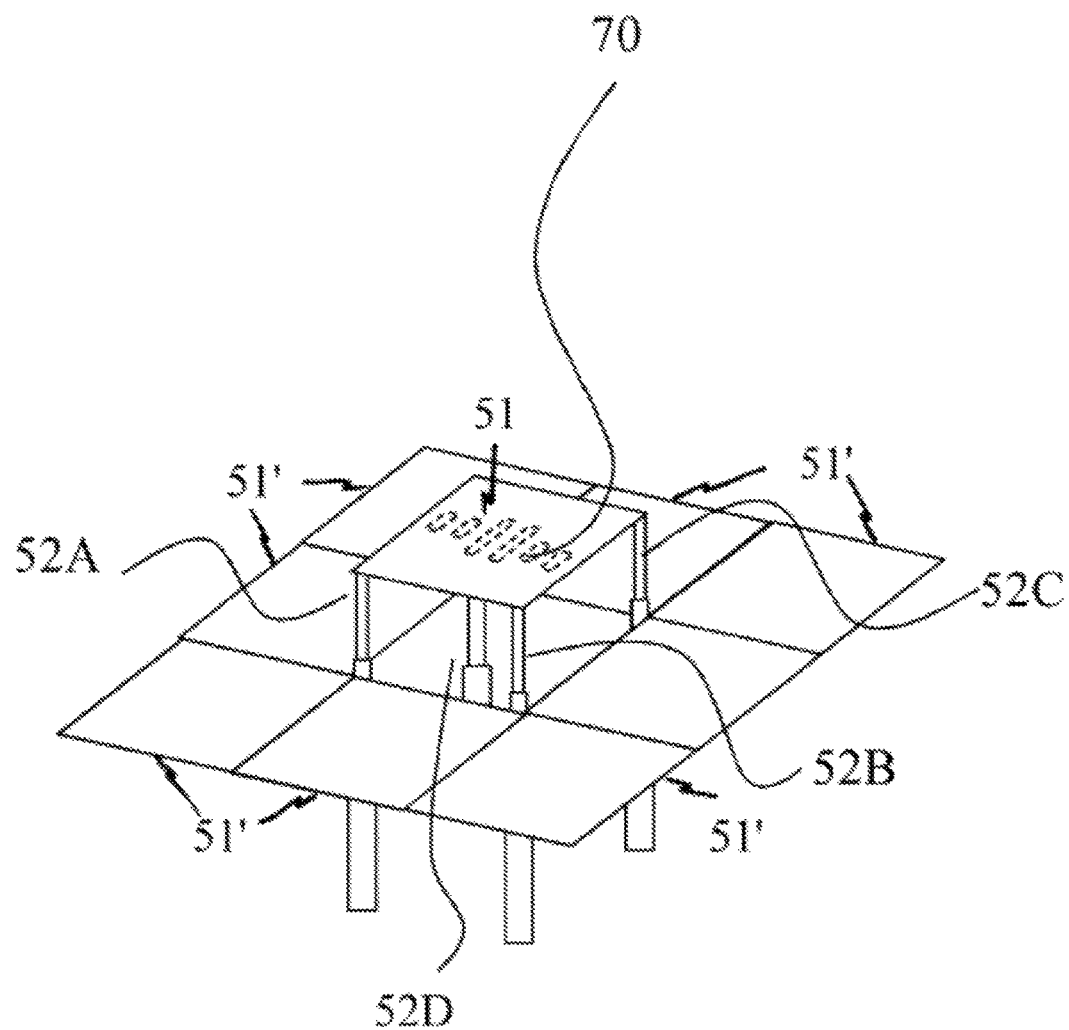
FIG. 1F is one example of an isometric view of the tile with telescope legs in a raised position and surrounded by regular tiles at the side, back and front.

Referring to FIG. 1F, there is shown an isometric view of the sensor tile 51 of one embodiment completely surrounded by eight regular tiles 51' and with the sensor tile 51 in a raised position.

Figure 1G:
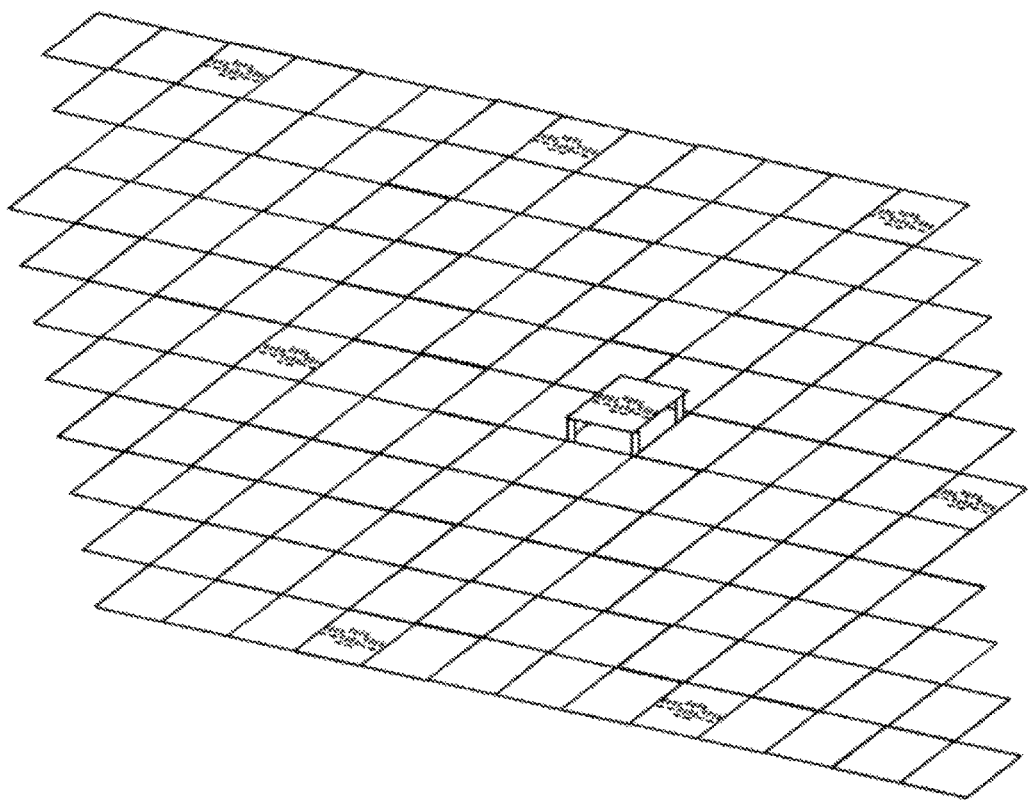
FIG. 1G is one example of an isometric view of the tile with telescope legs in a raised position and surrounded by at least five regular tiles at the side, back and front.

Referring to FIG. 1G, there is shown an isometric view of a raised floor. One of the sensor tiles is in a raised position and surrounded by at least five regular tiles at the side, back and front.

Figure 2:
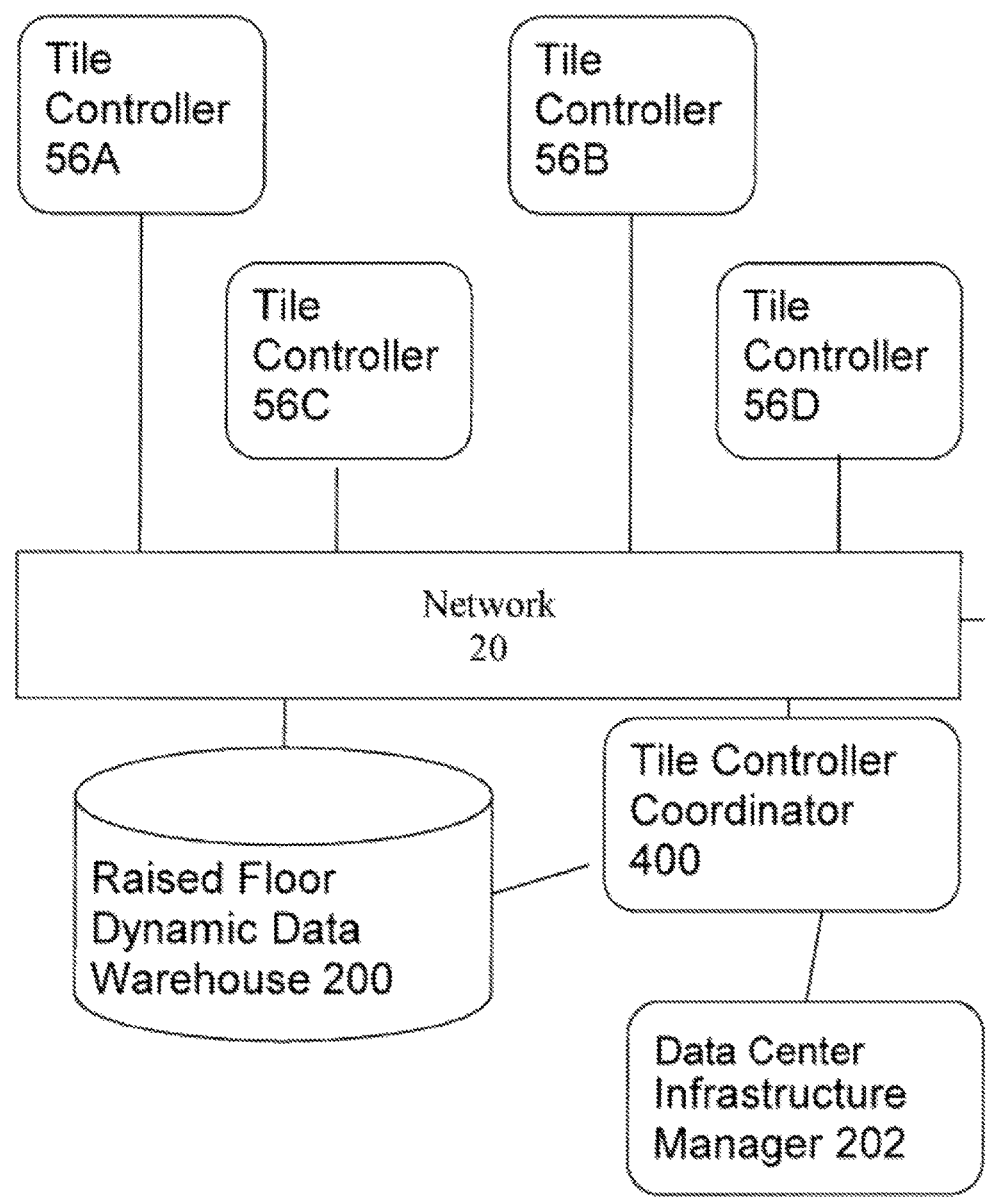
FIG. 2 is one example of a schematic view of a network of tile controllers and a tile controller coordinator.

Referring to FIG. 2, a network of tile controllers 56A to 56D (under respective sensor tiles 51) are connected via network 20 to: a raised floor dynamic data warehouse 200; a data center infrastructure manager 202; and a tile controller coordinator 400.

Four tile controllers 56A to 56D are shown, but it is envisaged that many more would be connected in one system.

Network 20 is any network but could also be the Internet.

Raised floor dynamic data warehouse 200 is for consolidating the data from the individual local data stores of the tile controllers.

Data center infrastructure manager 202 is a standard user interface for managing data center infrastructure and connects to the network of tile controllers 56A to 56D via tile controller coordinator 400.

Tile controller coordinator 400 is for coordinating the data from the networked tile controllers so that useful information can be extracted and used by the data center infrastructure manager 202.

Figure 3:
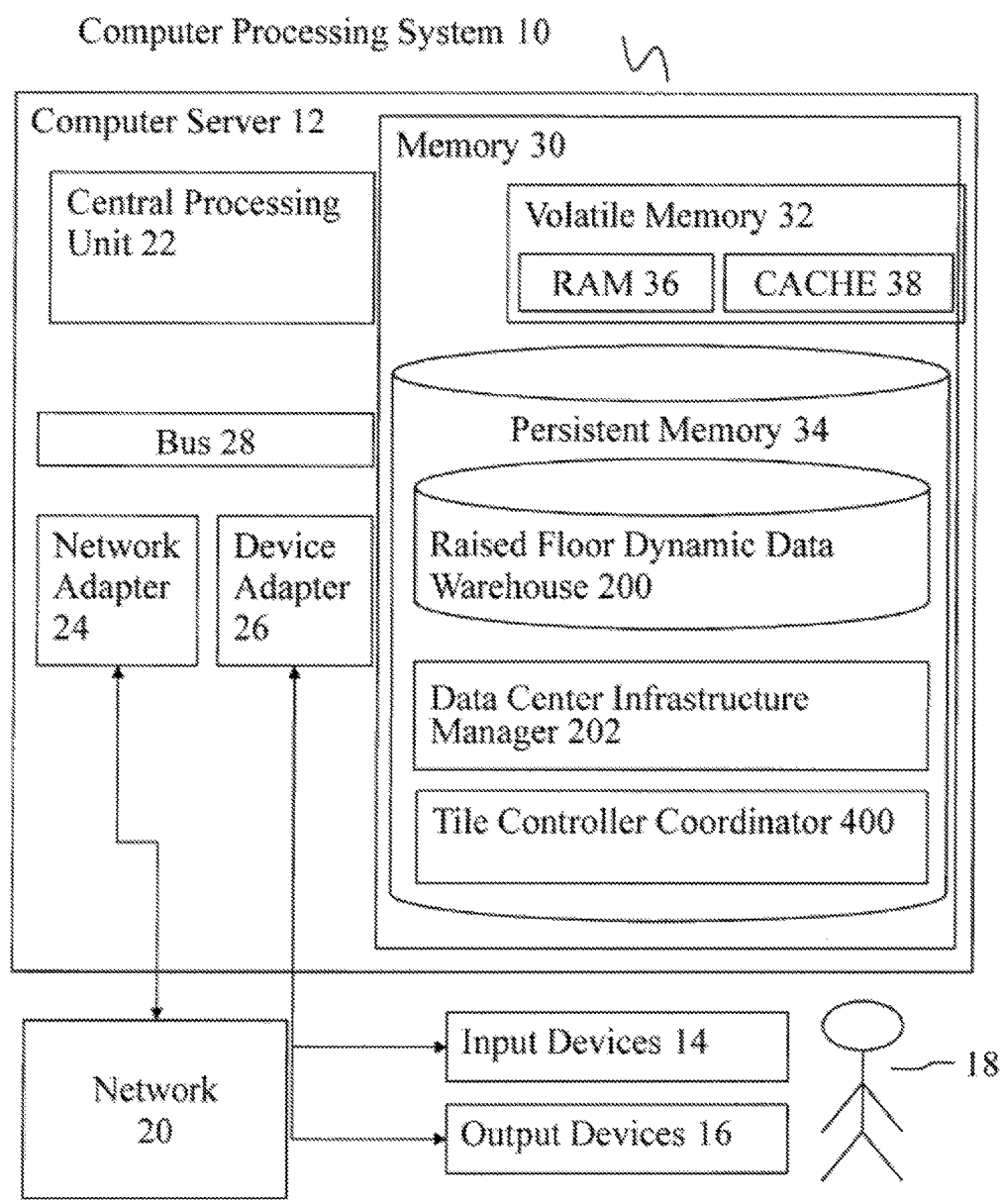
FIG. 3 is one example of a deployment diagram of a tile controller coordinator of one embodiment.

Referring to FIG. 3, the deployment of one embodiment including the tile controller coordinator 400; the raised floor dynamic warehouse 200; and the data center infrastructure manager 202 in a computer processing system 10 is described. While one embodiment is a single computer processing system, each of the three components can be individually deployed in separate computer processing systems.

Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 includes, for example: a general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 includes, for instance: a central processing unit (CPU) 22; a network adapter 24; a device adapter 26; a bus 28 and memory 30.

CPU 22 loads machine instructions from memory 30 and performs machine operations in response to the instructions. Such machine operations include, for example: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program; the machine instructions are written in a machine code language which is referred to as a low level language. A computer program written in a high level language is to be compiled to a machine code program before it is run. Alternatively, a machine code program such as a virtual machine or an interpreter can interpret a high level language in terms of machine operations.

Network adapter 24 is connected to bus 28 and network 20 for enabling communication between the computer server 12 and the network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA), Micro Channel Architecture (MCA), Enhanced ISA (EISA), Video Electronics Standards Association (VESA) local, and Peripheral Component Interconnects (PCI).

Memory 30 includes computer system readable media in the form of volatile memory 32 and non-volatile or persistent memory 34. Examples of volatile memory 32 are random access memory (RAM) 36 and cache memory 38. Generally, volatile memory is used because it is faster, and generally, non-volatile memory is used because it will hold the data for longer. Computer processing system 10 may further include other removable and/or non-removable, volatile and/or non-volatile computer system storage media. By way of example only, persistent memory 34 may be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of one embodiment includes, for instance: raised floor dynamic data warehouse 200; data center infrastructure manager 202; and tile controller coordinator 400. Further program modules that support one or more embodiments but are not shown include, for instance, firmware, a boot strap program, an operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Referring to FIG. 4, tile controller coordinator 400 includes, for example, the following components: tile interface 402; threshold registers 404; sensor comparator 406; image comparator 408; infrared image comparator 410; data center interface 412; and tile controller coordinator method 500.

Tile interface 402 is for communicating with the individual tile controllers.

Threshold registers 404 store the threshold reference data for the sensors so that the tile controller coordinator can determine when an individual sensor has gone out-of-band (above or below threshold references).

Sensor comparator 406 is for comparing actual sensor data with threshold reference data.

Image comparator 408 is for comparing image data from a camera with reference image data and locating a difference.

Infrared image comparator 410 is for comparing infrared image data from a camera with reference image data and locating a difference.

Data center interface 412 is for communicating results with data center infrastructure manager 202.

Tile controller coordinator method 500 is for performing the method of one embodiment using the other components of the tile controller coordinator 400.

Figure 5:
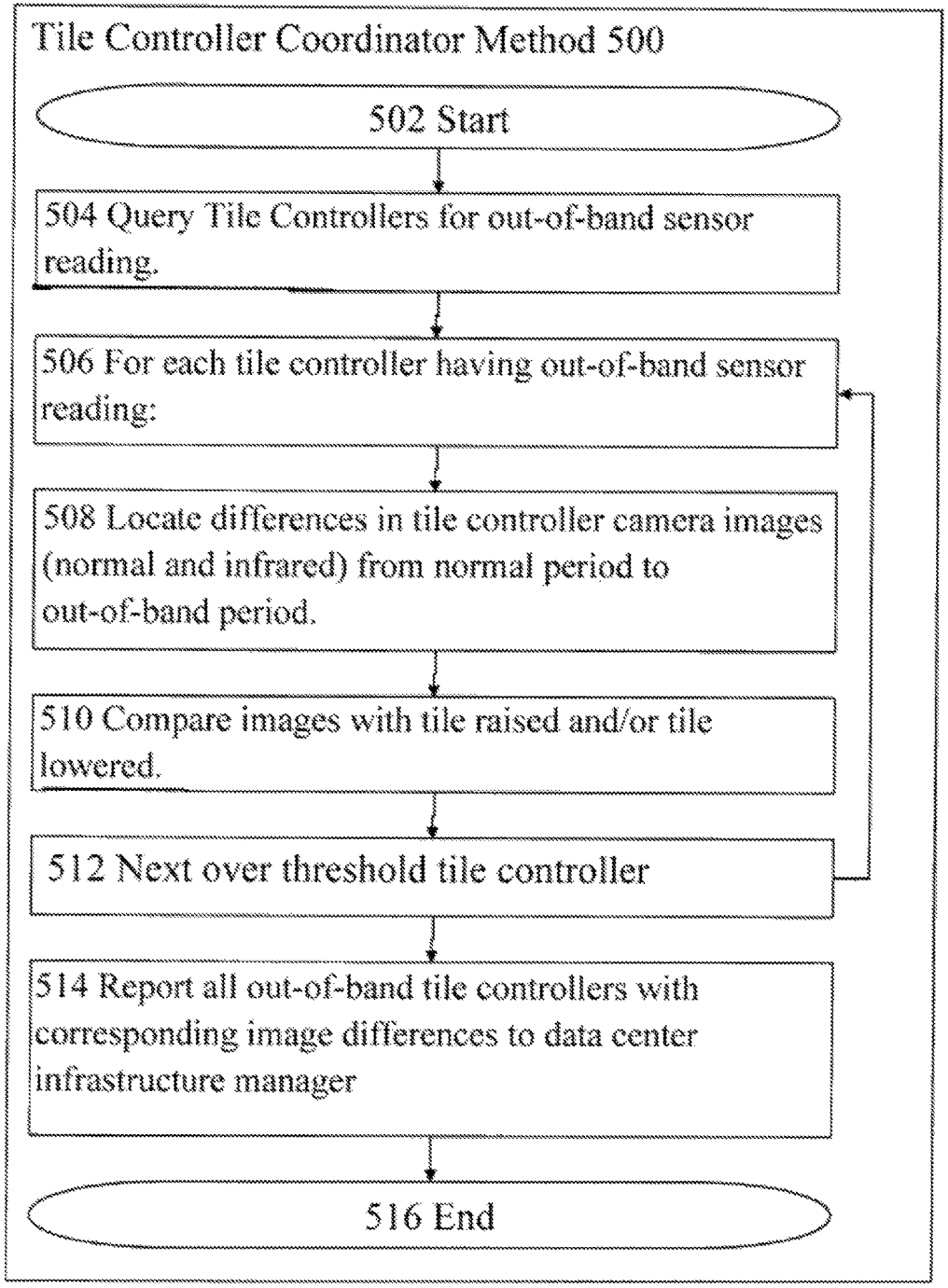
FIG. 5 is one example of a flow diagram of a process of the tile controller coordinator of one embodiment.

Referring to FIG. 5, tile controller coordinator method 500 includes, for example, logical process steps 502 to 516.

Step 502 is the start of tile controller coordinator method 500. Generally, method 500 loops periodically, but it may be triggered by an error event or out-of-band sensor reading.

Step 504 is for querying, e.g., all tile controllers and receiving tile controller data including sensor reading that are out-of band (over or under predetermined thresholds).

Step 506 is for defining a loop for each tile controller having an out-of-band sensor reading.

Step 508 is for locating differences in respective tile controller camera images, first normal images and then infrared images, over a period of time corresponding to the out-of-band sensor reading.

Step 510 is for locating differences in respective tile controller camera images with a tile raised and/or lowered.

Step 512 is for looping back to step 506 for the next out-of-band sensor reading.

Step 518 is for reporting alerts for image differences for out-of-band sensor readings to data center infrastructure manager.

As described herein, in a first aspect of the invention, there is provided a system for monitoring conditions under a raised floor in a data center including: a grid of closely spaced and raised floor tiles having regular floor tiles interspersed with sensor floor tiles, the sensor floor tiles including: one or more sensors to monitor conditions under the raised floor; one or more cameras to collect images of conditions under the raised floor; a sensor controller for locating a sensor tile with a sensor condition that is out-of-band from a reference condition band; and a camera controller for locating an image difference corresponding to the out-of-band sensor condition.

In a second aspect of the invention, there is provided a sensor floor tile for monitoring conditions under a raised floor in a data center, the raised floor including a grid of closely spaced and raised floor tiles having regular floor tiles interspersed with sensor floor tiles, the sensor floor tile including: one or more sensors to monitor conditions under the raised floor; one or more cameras to collect images of conditions under the raised floor; a sensor controller for locating a sensor tile with a sensor condition that is out-of-band from a reference condition band; and a camera controller for locating an image difference corresponding to the out-of-band sensor condition.

In a third aspect of the invention, there is provided a sensor floor controller for monitoring conditions under a raised floor in a data center, the raised floor including a grid of closely spaced and raised floor tiles having regular floor tiles interspersed with sensor floor tiles, the sensor floor controller including: an interface to one or more sensors to monitor conditions under the sensor tile; an interface to one or more cameras to collect images of conditions under the raised floor; a sensor comparator for locating a sensor tile with a sensor condition that is out-of-band from a reference condition band; and a camera comparator for locating an image difference corresponding to the out-of-band sensor condition.

In a fourth aspect of the invention, there is provided a method for monitoring conditions under a raised floor in a data center, the raised floor including a grid of closely spaced and raised floor tiles having regular floor tiles interspersed with sensor floor tiles, the sensor floor tiles having one or more sensors and one or more cameras to monitor conditions under the sensor tile, the method including: locating a sensor tile with a sensor condition that is out-of-band from a reference in-band condition; and locating an image difference corresponding to an out-of-band sensor condition.

One or more of the cameras is an infrared camera. An infrared camera is also known as a thermal imaging camera. The infrared camera is, e.g., an uncooled infrared camera.

One or more of the cameras is a visible spectrum camera. In one embodiment, one or more of the cameras is a full spectrum camera.

One or more cameras are wide angled and point down from the sensor tile. One or more cameras take pictures parallel with the surface of the sensor tile. A camera post mounted on the sensor can be raised or lowered. The camera post is controllable to rotate the mounted camera. Alternatively multiple cameras are mounted on the camera post. One of the sensors is one or more of: a temperature sensor; a pressure sensor; and a humidity sensor.

In a fifth aspect of the invention, there is provided a computer program product for monitoring conditions under a raised floor in a data center, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a sixth aspect of the invention, there is provided a computer program stored on a computer readable medium and loadable into the internal memory of a computer, comprising software code portions, when said program is run on a computer, for performing all the steps of the method claims.

In a seventh aspect of the invention, there is provided a data carrier aspect that includes functional computer data structures to, when loaded into a computer system and operated upon thereby, enable the computer system to perform all the steps of the method claims. A suitable data-carrier could be a solid-state memory, magnetic drive or optical disk. Channels for the transmission of data may likewise include storage media of all descriptions, as well as signal-carrying media, such as wired or wireless signal-carrying media.

One or more embodiments use out-of-band sensor readings to focus a search for possible reasons in the images during the time periods for the out-of-band sensor readings. Another embodiment is envisaged that monitors the images from all time periods for differences and uses the sensor readings to determine if these differences are significant.

Further embodiments of the invention are described. It will be clear to one of ordinary skill in the art that all or part of the logical process steps of one or more embodiments may be alternatively embodied in a logic apparatus, or a plurality of logic apparatus, including logic elements arranged to perform the logical process steps of the method and that such logic elements may include hardware components, firmware components or a combination thereof.

It will be equally clear to one of skill in the art that all or part of the logic components may be alternatively embodied in logic apparatus including logic elements to perform the steps of the method, and that such logic elements may include components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, one or more aspects may be realized in the form of a computer implemented method of deploying a service including steps of deploying computer program code operable to, when deployed into a computer infrastructure and executed thereon, cause the computer system to perform the steps of the method.

It will be appreciated that the method and components of one or more embodiments may alternatively be embodied fully or partially in a parallel computing system including two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiments without departing from the scope of aspects of the present invention.

What is claimed is:

1. A sensor floor tile comprising:
   one or more sensors to monitor conditions under a raised floor, wherein the one or more sensors is attached to an underneath side of the sensor floor tile; and
   one or more cameras to collect images of conditions under the raised floor, wherein the one or more cameras is attached to the underneath side of the sensor floor tile; and
   at least two cameras fixed to a camera post hanging from the sensor floor tile.

2. The sensor floor tile of claim 1 wherein at least one camera of the one or more cameras is an infrared camera.

3. The sensor floor tile of claim 2 wherein the infrared camera is an uncooled infrared camera.

4. The sensor floor tile of claim 2 wherein at least one camera of the one or more cameras is a visible spectrum camera.

5. The sensor floor tile of claim 2 wherein at least one camera of the one or more cameras is a full spectrum camera.

6. The sensor floor tile of claim 1 wherein at least one camera of the one or more cameras is wide angled and points down from the sensor floor tile.

7. The sensor floor tile of claim 1 wherein at least one camera of the one or more cameras takes pictures parallel with the surface of the sensor floor tile.

8. The sensor floor tile of claim 1 wherein the one or more sensors is at least one of a temperature sensor, a pressure sensor, and a humidity sensor.

* * * * *